(12) United States Patent
Prybutok et al.

(10) Patent No.: US 10,744,360 B2
(45) Date of Patent: Aug. 18, 2020

(54) ENERGY DISSIPATIVE FLOOR MAT, MAT SYSTEM, AND MANUFACTURING PROCESS

(71) Applicant: POLYMER TECHNOLOGIES, INC., Newark, DE (US)

(72) Inventors: Robert Prybutok, Newark, DE (US); Robert Marsh, Wilmington, DE (US)

(73) Assignee: Polymer Technologies, Inc., Newark, DE (US)

( * ) Notice: Subject to any disclaimer, the term of this patent is extended or adjusted under 35 U.S.C. 154(b) by 10 days.

(21) Appl. No.: 15/945,299

(22) Filed: Apr. 4, 2018

(65) Prior Publication Data

US 2018/0280751 A1 Oct. 4, 2018

Related U.S. Application Data

(60) Provisional application No. 62/481,371, filed on Apr. 4, 2017.

(51) Int. Cl.
*B32B 3/10* (2006.01)
*A63B 6/00* (2006.01)

(52) U.S. Cl.
CPC ............ *A63B 6/00* (2013.01); *B32B 3/10* (2013.01); *B32B 2250/03* (2013.01); *B32B 2375/00* (2013.01); *B32B 2471/04* (2013.01); *Y10T 428/16* (2015.01); *Y10T 428/161* (2015.01); *Y10T 428/234* (2015.01); *Y10T 428/236* (2015.01); *Y10T 428/239* (2015.01)

(58) Field of Classification Search
CPC ............ Y10T 428/16; Y10T 428/161; Y10T 428/234; Y10T 428/236; Y10T 428/239; A63B 6/00; A63B 6/02; B32B 3/10; B32B 2471/04; E01C 13/045
See application file for complete search history.

(56) References Cited

U.S. PATENT DOCUMENTS

| | | | |
|---|---|---|---|
| 9,278,243 B1 * | 3/2016 | Heartsfield | A63B 6/00 |
| 9,416,305 B2 | 8/2016 | Sereboff | |
| 2009/0233511 A1 * | 9/2009 | Turner | B32B 1/06 442/373 |
| 2011/0142539 A1 * | 6/2011 | Sekine | E01C 9/08 404/35 |
| 2012/0177867 A1 * | 7/2012 | Kuo | A47L 23/266 428/71 |
| 2013/0291457 A1 * | 11/2013 | Tillery | E04F 15/22 52/177 |

\* cited by examiner

*Primary Examiner* — Alexander S Thomas
(74) *Attorney, Agent, or Firm* — RatnerPrestia

(57) ABSTRACT

A composite floor mat having an upper layer, a middle layer, and a bottom layer. The upper layer comprises a durable wear surface, the middle layer comprises a plurality of pockets, each filled with an energy dissipative material. The bottom layer is bound to the upper layer and defines a perimeter of the mat and a network of ribs defining the pockets of the middle layer. A mat system comprises a plurality of mat components positioned adjacent one another, including edge mat components, corner mat components, and internal mat components, held together by retaining clips disposed in a channels of the mat components. A process for manufacture of a floor mat assembly, and product produced thereby, are also disclosed.

19 Claims, 4 Drawing Sheets

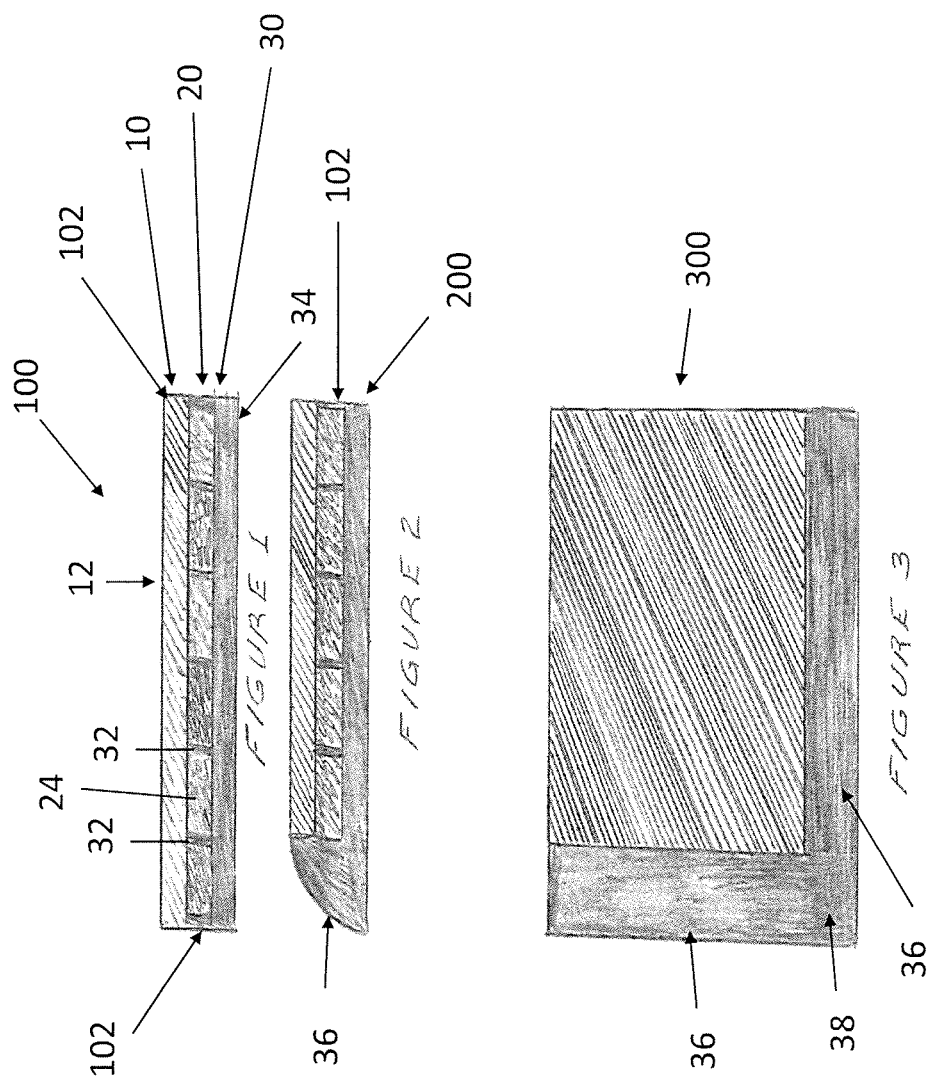

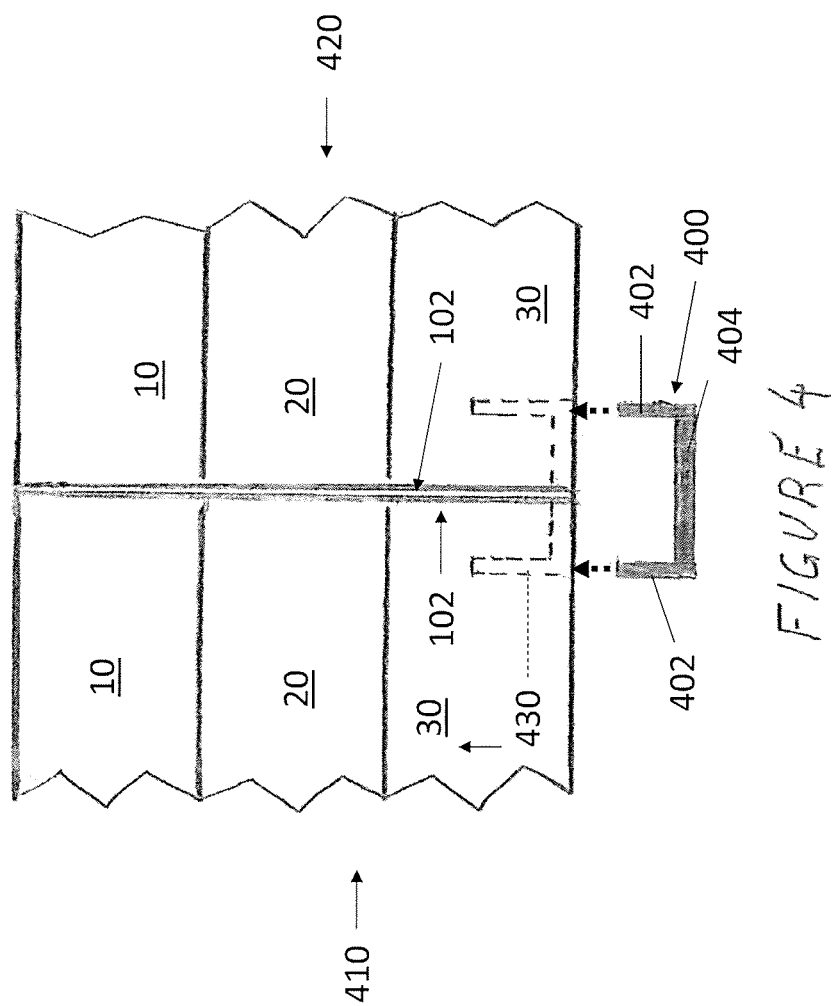

ENERGY DISSIPATIVE FLOOR MAT, MAT SYSTEM, AND MANUFACTURING PROCESS

CROSS-REFERENCE TO RELATED APPLICATIONS

THIS application claims priority to U.S. Provisional Application Patent Application No. 62/481,371, titled "ENERGY DISSIPATIVE FLOOR MAT," incorporated herein by reference in its entirety.

BACKGROUND

Gyms located in commercial settings in shared spaces with retail and commercial businesses are becoming prevalent. In intense group exercise regimens, and particularly with weight lifting routines, vibration and impact noise is easily transmitted to adjacent structures. In weight lifting, in extreme cases, free weights (e.g. dumbbells and barbells) weighing 100-300 lbs. or more may be dropped from heights of up to 8 feet or more. The impacts of these weights hitting the floor should optimally be cushioned to minimize impact noise transmitted through the floor structure and felt and heard in adjacent or connected parts of the shared space.

Floor mats of many configurations have been developed to attempt to mitigate this problem. Typically prior art floor mats comprise homogeneous materials of a variety of configurations made from durable rubber.

BRIEF DESCRIPTION OF THE DRAWINGS

FIG. 1 depicts a cross-section of a mat component having all straight edges from top to bottom.

FIG. 2 depicts a cross-section of a curved edge mat component.

FIG. 3 depicts a plan view of a curved corner mat component.

FIG. 4 depicts a cross-sectional view of an exemplary fastening system for connecting adjacent mat components in a mat system.

SUMMARY OF THE INVENTION

Figure 5:
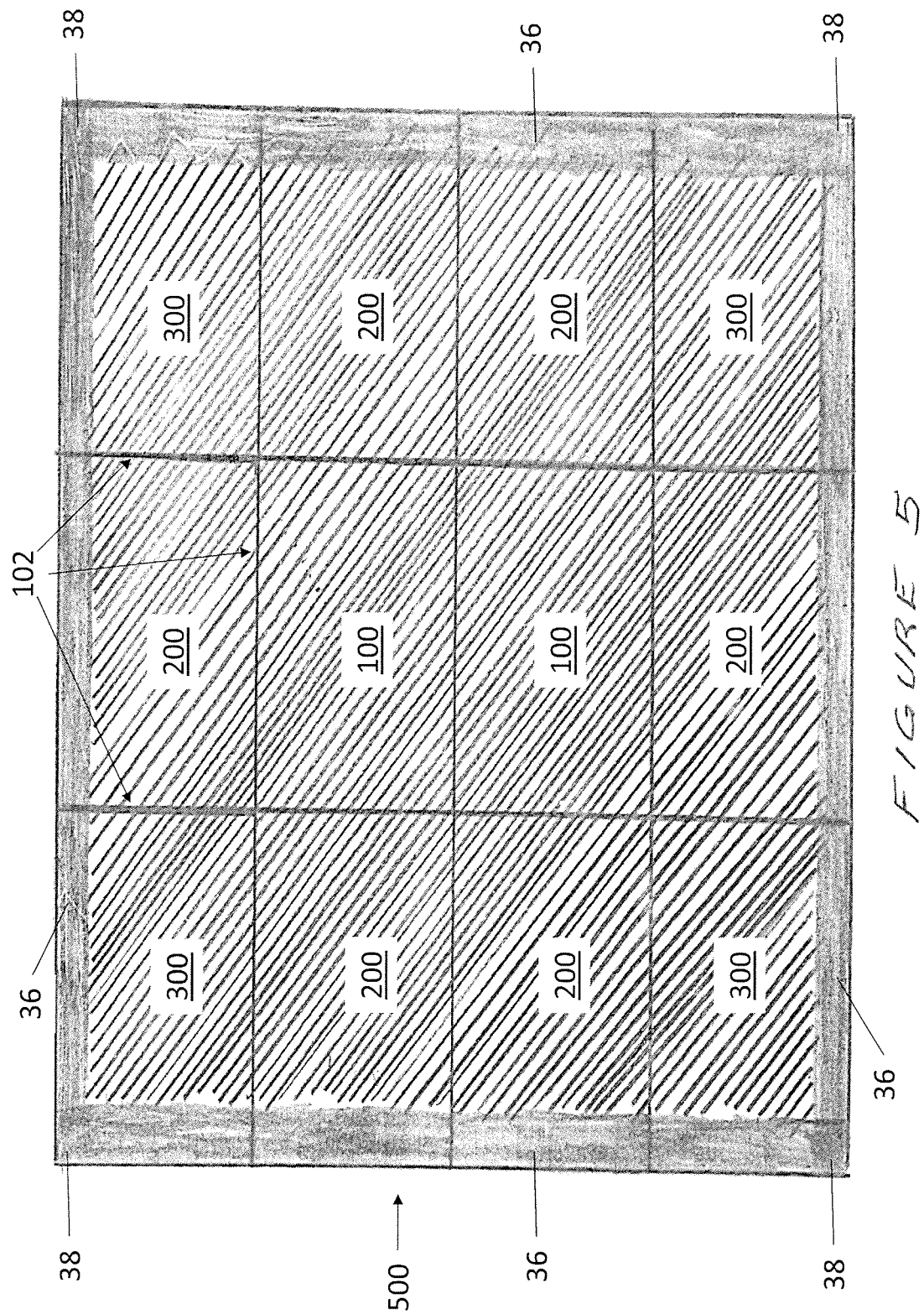
FIG. 5 depicts a plan view of an exemplary mat system comprising a collection of the components depicted in FIGS. 1, 2 and 3.

One aspect of the invention is a composite floor mat having an upper layer, a middle layer, and a bottom layer. The upper layer of material comprises a durable wear surface, such as a natural or synthetic rubber or elastomer or a poured polyurethane, configured to face away from a floor on which the mat is disposed. The middle layer comprises a plurality of pockets, each pocket filled with an energy dissipative material. The bottom layer, such as a urethane, or more specifically a microcellular polyurethane, is bound to the upper layer and configured to face the floor on which the mat is disposed. The bottom layer defines a perimeter of the mat and a network of ribs defining the pockets of the middle layer. The bottom layer and the network of ribs may together comprise a monolithic member The pockets of energy dissipative material may be disposed in a regular pattern. The energy dissipative material preferably has the properties of a Bingham fluid and may comprise a synthetic plastic shell filled with semi-processed fluid or gel. The floor mat may have at least one curved perimeter portion, such as along one edge of a square or rectangular mat, wherein at least one edge of the perimeter of the mat in cross section has a curvature from the top surface to the bottom surface of the mat. The floor mat may also have at least one curved corner portion, such as where two edges of the perimeter in cross section having a curvature from the top surface to the bottom surface of the mat intersect at a corner.

Another aspect of the invention comprises a mat system comprising a plurality of mat components configured to be positioned adjacent one another. Each mat component may comprise (a) an edge mat component having at least one edge of the perimeter in cross section with a curvature from the top surface to the bottom surface of the mat section; (b) a corner mat component having at least two edges of the perimeter in cross section with a curvature from the top surface to the bottom surface of the mat section and at least one corner at which the at least two edges intersect; or (c) an internal mat component in which each edge of the perimeter in cross-section is normal to the top and bottom surfaces of the mat section. In the composite floor mat system, the perimeter of each edge of each mat component that is disposed face-to-face with another mat component edge may be normal to the top and bottom surfaces of the mat section. The mat system may further comprise at least one two-prong retaining clip configured to retain adjacent mat sections in contact with one another, and each mat section may have a channel positioned therein to receive one prong of the two-prong retaining clip.

Another aspect of the invention is a process for manufacturing a floor mat assembly. The process includes the sequential steps of (a) providing a tool comprising a base and a lid, and (b) placing a first layer in the base of the tool. The first layer comprises a material configured to provide a durable wear surface of the floor mat configured to face away from the floor in use. In step (c), a plurality of portions of energy dissipative material are distributed on the first layer in a predetermined pattern, with a predetermined separation distance between adjacent portions. Next, in step (d), the process comprises dispensing a non-cured fluid around the energy dissipative portions, around a perimeter of the tool, and over the first layer. The non-cured fluid is selected to form a bottom layer of the floor mat to face a floor on which the mat is disposed in use. In step (e), the lid is placed on the base of the tool and the bottom layer is cured, and in step (f) the floor mat assembly is removed from the tool. The non-cured fluid may comprise a polyurethane that reacts, foams and fills the tool during the curing step. The tool may be held at a consistent temperature during the curing step, such as a temperature selected between 120 F and 150 F. The tool base and lid may be connected to one another with a hinge.

Still another aspect of the invention is a floor mat assembly product manufactured by the process described above.

DESCRIPTION OF THE INVENTION

One aspect of the invention comprises a composite mat that utilizes a durable upper wear surface, such as rubber or a tough poured polyurethane, with an inner layer of energy dissipative material, such as SEREFLEX® cushioning, placed in a pattern, with a poured bottom layer, such as microcellular polyurethane. Floor mats as described herein significantly absorb and dissipate impact energy from the weight and foot impact typical in the gym environments.

One embodiment of the energy dissipative floor mat 100 is depicted in FIG. 1. An upper layer 10 having a tough, durable wear surface 12, such as a natural or synthetic rubber or elastomer or a poured polyurethane, is designed to handle the multiple impacts of dropped weights and excessive foot fall traffic. A middle layer 20 of the mat comprises pockets filled with an energy dissipative material 24, typically in a homogeneous pattern. The bottom layer 30 of the mat comprises ribs 32 separating the energy dissipative materials 24 and defining pockets bounded by the ribs. The bottom layer of the mat 30 may comprise, for example, a micro-cellular polymer material that bonds to the upper layer 10, defines the perimeter of the mat 36, 38, 102 and forms the separating ribs 32. Although shown having a regular shape, it should be understood that the ribs may have irregular shapes that envelop the energy dissipative materials in whatever shape the energy dissipative materials may comprise. Section 100 may comprise a full floor mat, or one section of a group of floor mats intended to be connected together to create a floor covering for a desired area. As depicted in FIG. 1, each edge 102 is normal (perpendicular) to top surface 12 and bottom surface 34. A mat with this perimeter geometry on all four edges may be particularly well suited to be an internal component in a mat system, as further described below. In a mat system, comprising various components, including edge and corner components as described below, edges that are disposed face-to-face with one another are typically edges having the geometry of edge 102.

FIG. 2 shows an exemplary mat system component 200 having a curved edge 36 along one perimeter edge portion of the mat, which may be useful in applications in which the perimeter of the mat is not placed against a wall. In mats comprising a single section, all four perimeter edges may be so curved. The curved edge may in other embodiments form fewer than all of the perimeter edges of the mat. A mat with this perimeter geometry on at least one edge may be particularly well suited to be an edge component in a mat system, as further described below.

FIG. 3 shows an exemplary mat system component 300 having a curved corner 38 in a portion of the mat in which two curved, intersecting edges 36 connect to one another. Mat system components having a curved corner 38 may be particularly desirable for use in applications in which the mat is positioned in an open portion of a room (i.e. not against a corner wall). In applications comprising a single section, all four corners of the mat may be so formed. In other applications, fewer than all of the corners may have such a curvature. A mat with this perimeter geometry in at least one corner may be particularly well suited to be a corner component in a mat system, as further described below.

FIG. 5 depicts a mat system comprised of mat components 100, 200, and 300 combined, providing a curved perimeter on the outer edges and corners of the mat system by positioning each type of mat configuration in a logical pattern that allows easy entry to the floor system from all directions. It should be understood that if any one or more of the mat edges is intended to lie in contact with a wall, the curved perimeter may be omitted on such edges. In the mat system depicted in FIG. 5, each edge of each mat component that is disposed face-to-face with another mat component edge is preferably normal to the top and bottom surfaces of the mat component.

FIG. 4 shows an exemplary two-prong clip 400 configured to fit into a mating channel 430 in the bottom of adjacent mat sections 410 and 420. Recessed channels 430 are preferably molded into each side of the mat in sufficient number and location to permit clips 400 to secure each mat to its intended adjacent mat. The channels 430 may comprise holes that are fully surrounded by portions of the mat structure, including holes lined with special reinforcing materials. The channel further comprises a groove open at the bottom of the mat such that the bottom of the clip lies on the floor under the mat. The clip 400 may comprise any material deemed strong enough to provide the strength needed to retain the mat sections together. Although depicted extending approximately 50% into the bottom layer of the mat, other lengths may be desirable. The clip 400 comprises prongs 402 and connecting section 404. Each channel 430 may have a mating geometry such that the outside edge of the connecting section 404 when inserted does not extend beyond the bottom surface of the mat and therefore lies flush with the floor, or even slightly indented. The channel 430 construction may include features (e.g. tapers, barbs, and the like—not shown) and/or the clips 400 may comprise materials of construction, features (prongs that mate with recesses in the channels, or vice versa—not shown), or coatings, intended to facilitate the clips being retained in place both in the channels and/or in connection with the floor, during normal use of the mat.

In one preferred embodiment, the energy dissipative material may comprise SEREFLEX®, synthetic plastic padding inserts, which are filled with semi-processed fluid or gel for shock absorption and distribution of pressure, from Sereflex Inventive Technologies. Suitable embodiments are described, for example, in U.S. Pat. No. 9,416,305 and equivalents thereof, incorporated herein by reference in their entireties, comprising compositions with thixotropic properties, comprising a suspending agent having particulates dispersed therein. However, other energy dissipative materials such as gels, viscoelastic foams, shear thinning or thickening materials, and the like, are well known in the art, and may be utilized. Thus, in one embodiment, as described in U.S. Pat. No. 9,416,305, the energy dissipative material may comprise "a substantially non-elastic incompressible composition which substantially does not quickly self-level under standard operating conditions." Furthermore, the composition may include "a suspending agent having fibrous material dispersed within the suspending agent" and the composition may have the "behavioral characteristics of a Bingham fluid such that the composition reacts as a solid when subjected to forces below a critical force, and which becomes flowable when subjected to forces above [the] critical force." The attribute of not quickly self-leveling and having characteristics of a solid below being subjected to certain critical forces, may have particular advantages in certain embodiments of the manufacturing processes described herein.

In the preferred embodiment, the bottom layer may comprise a microcellular polyurethane material, such as Polydamp® PHDM high density molded polyurethane foam, manufactured by Polymer Technologies, Inc., of Newark, Del. Other poured and cured polymers can also be used, such as flexible EVA's, PVC's, or synthetic or natural rubbers. The function of the microcellular polyurethane is to provide some level of cushioning and energy dissipation, but it also holds the assembly together by forming the pockets around the energy dissipative material sections and the ribs that bond the upper layer to the assembly. Thus, the lower layer and the ribs defining each pocket, once fully cured, may in preferred embodiments comprise a monolithic foam section.

Figure 6:
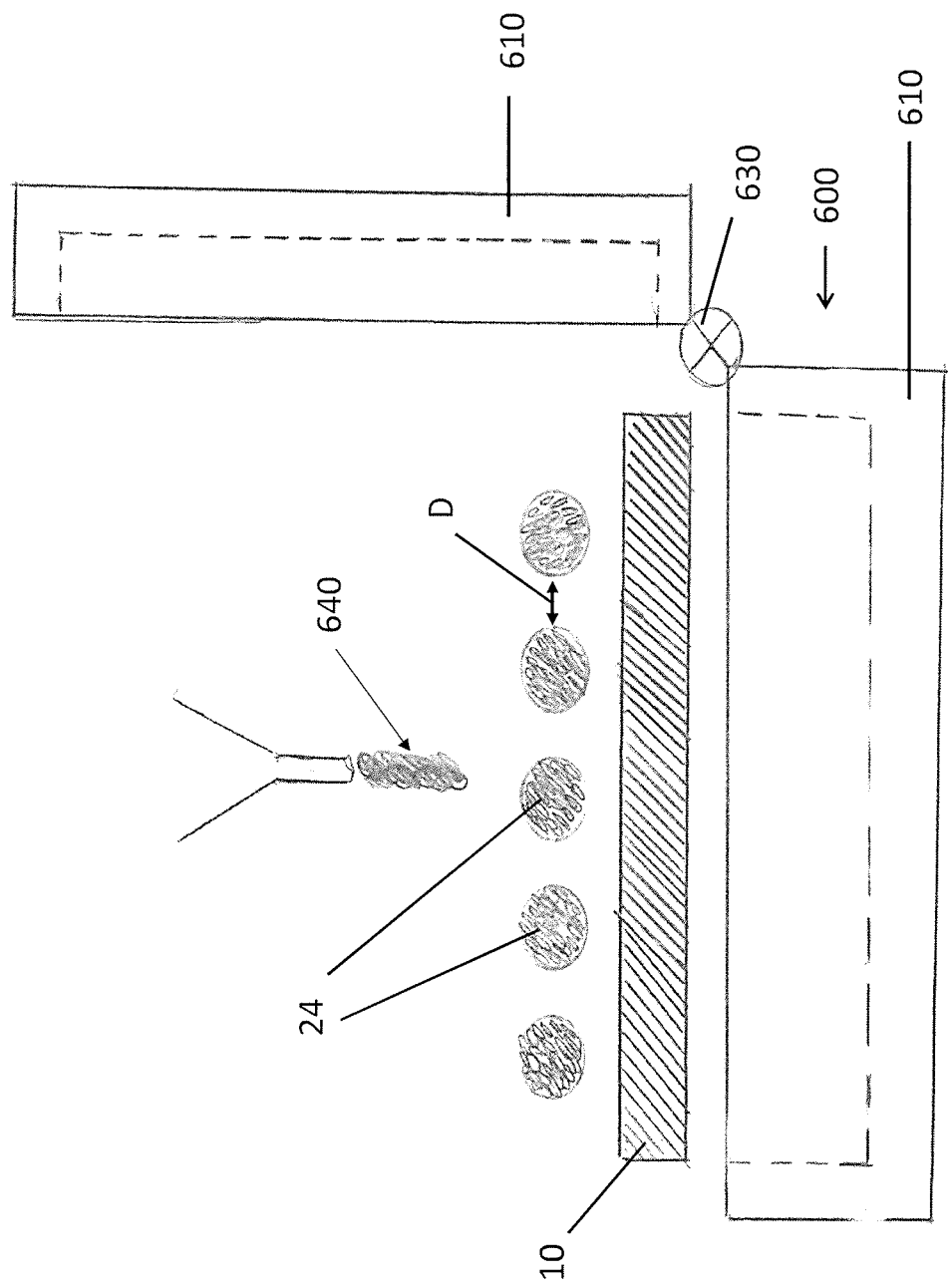
FIG. 6 depicts a cross sectional view of an exemplary mat assembly manufacturing process.

FIG. 6 depicts an exemplary floor mat assembly during an exemplary manufacturing process. In the process depicted in FIG. 6, a section of material selected to form the tough durable top surface 10 (such as a natural or synthetic rubber or elastomer, including but not limited to masticated rubber made from scrap tires and other rubber scrap regrind, or a poured polyurethane) is placed into the bottom of a hinged mold or tool 600. For poured polyurethane, the polyurethane may be poured in a thin layer and cured before completion of the next steps. The poured polyurethane, in such embodiments, may be a different grade in the top layer than in the bottom layer, or it may be the same. The mold or tool 600 may comprise a base 610 and a lid 620 connected by a hinge 630, and is typically may comprise cast or machined aluminum.

Pockets of the energy dissipative material are formed by placing into the mold or tool on base layer 10 a plurality of portions 24 of the energy dissipative material, in a predetermined pattern, with a predetermined separation distance (D) between adjacent portions. It should be noted that each portion may be have a predetermined geometry, such as a portion cut from a sheet, or a portion comprising a membrane or matrix that contains an energy dissipative fluid material within a confined shape, or each portion may merely comprise a measured amount of the energy dissipative material that does not have a fixed or uniform geometry, such as for energy dissipative materials that are sufficiently viscous as to be non-quickly-self-leveling. Although shown with a spherical geometry for illustrative purposes only in FIG. 6, it should be understood that the energy dissipative material as provided in the assembly may have any geometry, including a cuboid shape, a disk, or any regular or irregular geometry. In particular, if the energy dissipative material is supplied in measured portions of a non-quickly-self-leveling fluid, the portions may be non-uniform, with each portion as dispensed upon the base layer having a slightly different geometry from adjacent portions. For viscous fluid materials, the spacing of the dispensed portions is selected in conjunction with the overall viscosity of the material to ensure that the portions do not flow into one another after being disposed on the base layer. Additionally, for Bingham fluids, the forces associated with placement of the portions may be controlled so that the force of contact with the base layer and gravitational forces of the dispensed amount of material remain below the critical force at which the material becomes flowable (or at least below the critical force at which the material becomes sufficiently flowable to exceed a desired boundary around the dispensed material within a predetermined amount of time). For example, a suitable amount of dispensing force and portion size may be calculated that keeps the boundaries of the dispensed material from flowing away from a centerpoint of the portion more than a desired boundary around that centerpoint before the walls of the pockets that will ultimately confine the energy dissipative materials are sufficiently formed. The dispensing conditions may also be carefully controlled so as to provide portions of the Bingham fluids disposed on the base layer that have at least an approximately uniform geometry within a predetermined tolerance. That tolerance may be defined by a desired minimum distance between adjacent edges of the portions, which distance defines the minimum thickness of the ribs defining the walls of the pockets that will ultimately confine the energy dissipative material in the resulting final assembly.

Liquid polyurethane is then dispensed around the energy dissipative sections, around the perimeter of the tool, and over the wear/impact surface layer. Although the tool as depicted in FIG. 6 has normal (perpendicular to the top and bottom surfaces of the tool) edges, it should be understood that the tool may have a geometry suitable for forming the curved periphery and/or curved corners depicted in FIGS. 2 and 3. Lid 620 of tool 600 is closed and the polyurethane reacts, foams and fills the tool, thereby surrounding the portions of the energy dissipative materials and filling the spaces defined by the distance between the portions. Thus, for portions of energy dissipative materials provided in the manufacturing process with a predetermined geometry, the ribs may have a predetermined geometry defined by the spaces between the portions. For portions of energy dissipative materials provided in the manufacturing process with non-uniform geometries, the ribs may also have non-uniform geometries. In general, liquid polyurethane has a 15-45 minute window before foaming commences. In embodiments in which the pouring pattern is critical, pouring before closing the lid may be particularly desirable. In other embodiments, however, the lid may be closed before the polyurethane is added through a fill port. The tool/mold may be held at a consistent temperature, such as for example, typically between 120 F and 150 F for polyurethane, until the foam cures sufficiently to allow the composite mat to be removed from the tool/mold. The cure at the point of removal may be complete, or additional cure time may be required before the mat assembly is ready for handling and shipment to a customer.

Dimensions of each layer and the thickness of the mat may be varied depending on the performance characteristics desired. Without limitation, however, suitable dimensions may include, for example, a ¾-inch (0.75") bottom layer, a ¾-inch (0.75") energy dissipative layer and a ¾-inch (0.75") upper wear layer.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A composite floor mat comprising:
    an upper layer of material comprising a durable wear surface configured to face away from a floor on which the mat is disposed and an underside opposite the durable wear surface;
    a middle layer comprising a plurality of pockets, each pocket filled with a portion of an energy dissipative material having the properties of a Bingham fluid, each pocket conforming to a geometry of the portion of energy dissipative material contained therein; and
    a bottom layer configured to form a bottom surface of the mat configured to face the floor on which the mat is disposed, the bottom layer bound to the upper layer, defining a perimeter of the mat, and defining a network of ribs defining the plurality of pockets of the middle layer, wherein the bottom layer and the network of ribs together comprise a monolithic member formed of a material that bonds the monolithic member directly to the upper layer;
    wherein the plurality of pockets and network of ribs are the product of process steps comprising:
        dispensing a plurality of the portions of energy dissipative material on the underside of the durable wear surface,
        dispensing a non-cured material around the energy dissipative portions and over the upper layer, and
        curing the non-cured material to form the monolithic member,
    wherein adjacent portions of energy dissipative material in adjacent pockets have a different geometry within a predetermined tolerance from a uniform geometry and the corresponding ribs have a non-uniform geometry conforming to the geometries of the portions of energy dissipative material bounded thereby.

2. The composite floor mat of claim 1, wherein the durable wear surface comprises a natural or synthetic rubber or elastomer or a poured polyurethane.

3. The composite floor mat of claim 1, wherein the pockets of energy dissipative material are disposed in a regular pattern.

4. The composite floor mat of claim 1, wherein the energy dissipative material comprises a synthetic plastic shell filled with a fluid or gel.

5. The composite floor mat of claim 1, wherein the bottom layer comprises a urethane.

6. The composite floor mat of claim 5, wherein the bottom layer comprises a microcellular polyurethane.

7. The floor mat of claim 6, wherein the upper layer comprises a natural or synthetic rubber or elastomer.

8. The composite floor mat of claim 1, wherein the floor mat comprises at least one curved perimeter mat portion, the curved perimeter mat portion having a perimeter, and at least one edge of the perimeter in cross section has a curvature from the top surface to the bottom surface of the mat.

9. The composite floor mat of claim 8, wherein the floor mat comprises at least one curved corner mat portion, the curved corner mat portion having a perimeter comprising at least two edges of the perimeter in cross-section having a curvature from the top surface to the bottom surface of the mat and at least one corner at which the at least two edges intersect.

10. A mat system comprising a plurality of composite floor mat components positioned adjacent one another, each floor mat component comprising a floor mat of claim 1.

11. The mat system of claim 10, wherein each mat component in the plurality of mat component has a perimeter, each mat component selected from the group consisting of:
   an edge mat component in which at least one edge of the mat component perimeter in cross section has a curvature from the top surface to the bottom surface of the mat section;
   a corner mat component in which at least two edges of the mat component perimeter in cross section having a curvature from the top surface to the bottom surface of the mat section and at least one corner at which the at least two edges intersect; and
   an internal mat component in which each edge of the mat component perimeter in cross-section is normal to the top and bottom surfaces of the mat section.

12. The mat system of claim 11, wherein the perimeter of each edge of each mat component that is disposed face-to-face with another mat component edge is normal to the top and bottom surfaces of the mat component.

13. The mat system of claim 10, further comprising at least one retaining clip configured to retain each adjacent mat component in contact with one another, each retaining clip comprising two prongs.

14. The mat system of claim 13, wherein each mat component comprises a channel positioned to receive one prong of the retaining clip.

15. The floor mat of claim 1, wherein both the upper layer and the bottom layer comprise polyurethane.

16. The floor mat of claim 15, wherein the upper layer and the bottom layer comprise a same grade of polyurethane.

17. The floor mat of claim 15, wherein the upper layer comprises a different grade of polyurethane than the top layer.

18. The floor mat of claim 1, wherein the plurality of the portions of energy dissipative material are arranged in a predetermined pattern the predetermined tolerance is defined by a predetermined minimum distance separating adjacent edges of the adjacent portions of energy dissipative material, and the corresponding ribs have a predetermined minimum rib thickness corresponding to the predetermined minimum distance separating adjacent edges of the adjacent portions of the energy dissipative material.

19. The floor mat of claim 1, wherein the different geometry of the adjacent portions of energy dissipative material in adjacent pockets comprises differences caused by each portion of energy dissipative material flowing away from a centerpoint thereof after dispensing but before curing of the monolithic member.

* * * * *